United States Patent
Haeberle et al.

(10) Patent No.: US 6,628,452 B2
(45) Date of Patent: Sep. 30, 2003

(54) OPTICAL DEVICES

(75) Inventors: Walter Haeberle, Waedenswil (CH); Gian-Luca Bona, Hedingen (CH); Gerd K. Binnig, Wollerau (CH); Peter Vettiger, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/946,992

(22) Filed: Sep. 5, 2001

(65) Prior Publication Data

US 2002/0051265 A1 May 2, 2002

(30) Foreign Application Priority Data

Sep. 15, 2000 (EP) ............................. 00120084

(51) Int. Cl.⁷ ...................... G02F 1/29; G02B 26/08; G02B 6/26; G02B 6/42
(52) U.S. Cl. ................ 359/298; 359/223; 359/291; 385/18; 385/19
(58) Field of Search .................. 359/290, 291, 359/298, 196, 223; 385/16, 17, 18, 19

(56) References Cited

U.S. PATENT DOCUMENTS

| | | | | |
|---|---|---|---|---|
| 4,239,331 A | | 12/1980 | Aoyama | 385/16 |
| 4,575,697 A | | 3/1986 | Rao et al. | 333/157 |
| 5,016,978 A | * | 5/1991 | Fargette et al. | 359/234 |
| 5,148,506 A | * | 9/1992 | McDonald | 385/16 |
| 5,436,986 A | | 7/1995 | Tsai | 385/16 |
| 5,838,847 A | | 11/1998 | Pan et al. | 385/18 |
| 6,360,036 B1 | * | 3/2002 | Couillard | 385/19 |
| 2002/0135864 A1 | * | 9/2002 | Chiu et al. | 359/318 |

FOREIGN PATENT DOCUMENTS

| | | |
|---|---|---|
| EP | 0 510 629 A | 10/1992 |
| EP | 0 880 040 A | 11/1998 |
| EP | 0 965 868 A | 12/1999 |
| WO | WO 00 25160 A | 5/2000 |

OTHER PUBLICATIONS

Kazuo Hogari et al., "Electrostatically Driven Micromechanical 2 X 2 Optical Switch", Applied Optics, Optical Society Of America, Washington, US, vol. 30, No. 10, Apr. 1, 1991, pp. 1253–1257.

G. A. Magel et al., "Phosphosilicate Glass Waveguides For Phased–Array Radar Time Delay", Proceedings Of The SPIE, SPIE, Bellingham, VA, US, vol. 1703, Apr. 20, 1992, pp. 373–378.

Richard T. Chen et al. "A Low Voltage Micromachined Optical Switch By Stress–Induced Bending", Micro Electro Mechanical Systems, MEMS '99, Twelfth IEEE International Conference On Orlando, FL, USA, Jan. 17, 1999, pp. 424–428.

Steffen Glockner et al., "Micro–Opto–Mechanical Beam Deflectors", Optical Engineering, Soc. Of Photo–Optical Instrumentation Engineers, Bellingham, US, vol. 36, No. 5, May 1, 1997, pp. 1339–1345.

P. Vettiger, M. Despont, U. Drechsler, U. Durig, W. Haberle, M.I. Lutwyche, H.E. Rothuizen, R. Stutz, R. Widmer, and G.K. Binnig, "The "Millipede" —More Than One Thousand Tips For Future AFM Data Storage," IBM Journal of Research & Development, 2000, vol.44, No. 3—'Directions in information technology'.

\* cited by examiner

*Primary Examiner*—Loha Ben
*Assistant Examiner*—William Choi
(74) *Attorney, Agent, or Firm*—Derek S. Jennings

(57) ABSTRACT

An optical device comprises a substrate having a plane surface. An optical path is disposed on the substrate and extends in a plane parallel to the surface of the substrate. A recess intercepts the optical path. An optical element is provided for modifying light incident thereon. The optical element is moveable within the recess between a first position in which the optical element is located in the path and a second position in which optical element is remote from the path. A cantilever suspends the optical element for movement within the recess between the second and first positions in a direction normal to the surface of the substrate.

29 Claims, 4 Drawing Sheets

OPTICAL DEVICES

FIELD OF THE INVENTION

The present invention relates to an optical device, more particularly to an optical device having a substrate that includes a plane surface.

BACKGROUND OF THE INVENTION

Such devices are conventionally employed in optical switching applications such as optical cross point switch arrays. In a typical optical cross point switch array, first and second groups of coplanar, superposed, parallel optical paths are formed in a plane substrate. The first group of paths is generally disposed orthogonally to the second group paths such that a matrix of intersections is formed. At each intersection, an actuable reflective optical element is provided for selectively diverting light arriving at the intersection on a path of the first group onto a corresponding path of the second group. In a conventional example of such a switch array, the reflective optical elements are each actuated by a linear comb actuator operable to move the element into and out of the corresponding intersection in a direction coplanar with the optical paths. In another conventional example, the reflective optical elements are each provided by a moveable bubble of mercury contained in a closed tube crossing the corresponding intersection in a direction coplanar with the optical paths. In the optical devices herein before described, a relatively large amount of spaces is required to accommodate actuation of the optical element in a direction parallel to the planes of the paths. This demand on space mitigates against increasing the density of cross points in such devices. Accordingly, the switching matrices provided in such devices is relatively small; typically between 2×2 and 32×32. Furthermore, power consumption in conventional optical switching devices is relatively high. As optical networks become increasingly popular, there is a growing demand for higher density, lower power optical switching and routing solutions.

SUMMARY OF THE INVENTION

In accordance with the present invention, there is now provided an optical device having a substrate having a plane surface. An optical path is disposed on the substrate and extends in a plane parallel to the surface of the substrate. A recess intercepts the optical path. Further included is an optical element for modifying light incident thereon. The optical element is moveable within the recess between a first position in which the optical element is located in the path and a second position in which optical element is remote from the path. The device still further includes a cantilever for suspending the optical element for movement within the recess between the second and first positions in a direction normal to the surface of the substrate.

The present invention further extends to a method for manufacturing an optical device including the steps of providing a substrate having a substantially plane surface, providing an optical path on the substrate and extending the optical path in a plane parallel to the surface of the substrate, and forming, in the substrate, a recess intercepting the optical path. The steps further include suspending, via a cantilever, an optical element adapted to modify light incident thereon for movement within the recess, in a direction normal to the surface of the substrate, between a first position in which the optical element is located in the path and a second position in which optical element is remote from the path.

Furthermore, the present invention further extends to a method for manufacturing an optical device including the steps of providing a first substrate having a substantially plane surface, providing an optical path on the first substrate and extending said optical path in a plane parallel to the surface of the substrate, and forming, in the first substrate, a recess intercepting the optical path. The steps further include providing a second substrate having a substantially plane surface, providing a cantilever on the second substrate, mounting an optical element on the cantilever, supporting the surface of the second substrate parallel to the surface of the first substrate, and aligning the optical element carried by the second substrate for entry in the recess formed in the first substrate.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

Preferred embodiments of the present invention will now be described, by way of example only, with reference to the accompanying drawings.

DETAILED DESCRIPTION OF THE PREFERRED EMBODIMENTS

Figure 1:
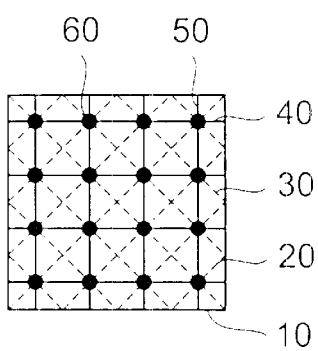
FIG. 1 is a plan view of an optical switching device embodying the present invention.

The cantilever arrangement of actuating the optical element advantageously demands less implementation space than conventional arrangements, thereby advantageously permitting realization of smaller and denser optical device arrays.

The optical element may comprise an attenuator. Alternatively, the optical element may comprise a polarizer. In another alternative the optical element may comprise a phase changer.

In a preferred embodiment of the present invention, the device comprises first and second optical paths each disposed on the substrate, each extending in a plane parallel to the surface of the substrate, and each intercepted by the recess; the optical element diverting light entering the recess on the first path onto the second path when the optical element is located in the first position. The optical element preferably comprises a reflective surface.

The first and second optical paths may be coplanar. The first optical path may be parallel to the second optical path. The reflective surface may comprise a pair a reflective faces meeting at an angle such that, when the optical element is located in the first position, light arriving at the surface from the first path is reflected via the faces into the second path, the direction of travel of the light along the second path being opposite to the direction of travel of light along the first path. The first and second optical paths may intersect, with the recess being located at the point of intersection. The reflective surface may be angled relative to the first and second paths such that, when the optical element is located in the first position, light arriving at the surface from the first path is reflected into the second path. The first path may be orthogonal to the second path and the reflective surface is angled substantially at 45 degrees relative to the first and second paths.

Alternatively, the plane containing the first path may be spaced from the plane containing the second path and the first path is parallel to the second path. The optical element may comprise a reflective surface having a pair a reflective faces meeting at an angle such that, when the optical element is located in the first position, light arriving at the surface from the first path is reflected via the faces into the second path, the direction of travel of the light along the second path being opposite to the direction of travel of light along the first path.

The optical element may comprise means for deflecting incident light such that, when the optical element is located in the first position, light entering the recess via the first path exits the recess via the second path, the direction of travel of the light in the first path being substantially the same as the direction of travel of the light in the second path.

In a particularly preferred embodiment of the present invention, the device comprises a group of first paths, a group of second paths, a plurality of row conductors, a plurality of column conductors, and a matrix of recesses each intercepting a different combination of the first and second paths, each recess having an optical element and a supporting cantilever associated therewith, and each optical element and supporting cantilever being addressable for movement between the first and second positions via a different combination of row and column conductors.

Therefore, each cantilever is formed on the substrate. However, in alternative embodiments of the present invention, the device comprises a first substrate and a second substrate facing the first substrate, the or each optical path being disposed on the first substrate and the or each cantilever being disposed on the second substrate, the optical element on the or each cantilever on the second substrate being aligned for entry in a corresponding recess in the first substrate.

The present invention extends to a dispersion compensator comprising a device as herein before described and means for configuring the optical elements to arranged at least some of the optical paths into one or more optical loops.

The present invention also extends, to an optical memory comprising a device as herein before described and means for configuring the optical elements to arranged at least some of the optical paths into one or more optical data storage loops.

Referring first to FIG. 1, an example of an optical switching device embodying the present invention comprises a plane substrate 10 on which is formed a first group 20 and a second group 30 of coplanar optical wave guides. The first group 20 and the second group 30 of wave guides are arranged orthogonally to each other to form a matrix of switching intersections or cross points 60. Row conductors 40 and column conductors 50 overly the wave guides 20 and 30. Optical switching elements (not shown) are provided at each cross point. Each switching cross point 60 is addressed by a different row conductor 40 and column conductor in combination 50. Normally, the optical switching elements are in a first state. In the first state, the switching elements permit passage of light through the switching device along wave guides of the first group 20. However, when addressed via corresponding the row and column conductors 40 and 50, each optical switching element diverts light approaching a cross point 60 on the corresponding wave guide in the first group 20 onto the corresponding wave guide in the second group 30. It will be made apparent shortly that various techniques fro addressing the optical elements are possible. Preferred examples of such techniques will be described in detail later. By way of illustration of relative dimensions possible for optical device arrays according to the present invention, a 32×32 matrix of optical switching devices embodying the present invention can be formed on a 3 mm by 3 mm square silicon substrate with distance between adjacent recesses 60 of 10 micro meters.

Figure 2:
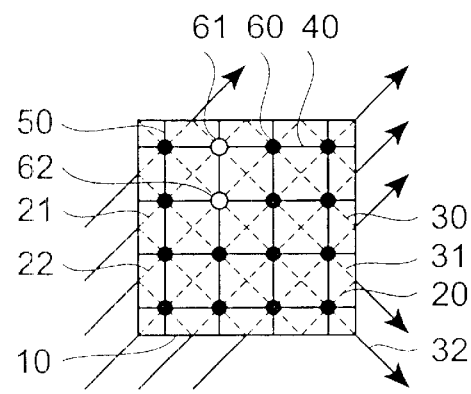
FIG. 2 is another plan view of an optical switching device embodying the present invention.

Referring now to FIG. 2, in the embodiment of the present invention illustrated therein, optical elements at cross points 61 and 62 are simultaneously addressed and thereby placed in the second position. Accordingly, light traveling into the device on wave guides 21 and 22 of the first group 20 is diverted to exit the device on wave guides 31 and 32 of the second group 30. Meanwhile, the remaining optical elements are in the first position. Therefore, light traveling into the device on the other wave guides of the first group 20 also passes through the device without diversion.

Figure 3:
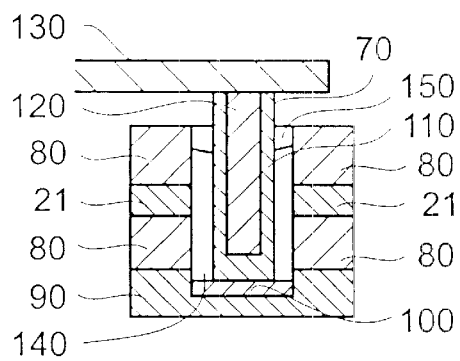
FIG. 3 is a cross-sectional view through a switching intersection of an optical switching device embodying the present invention.
Figure 4:
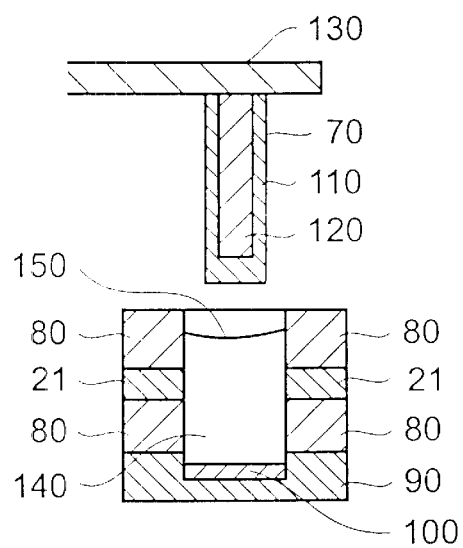
FIG. 4 is another cross-sectional view through a switching intersection of an optical switching device embodying the present invention.

Referring now to FIG. 3, in a preferred embodiment of the present invention, the device comprises a substrate 90 of silicon on which a layer 80 of silicon oxide is disposed. Embedded in and encapsulated by the oxide layer 80 are the aforementioned optical wave guides 20 and 30. Wave guide 21 is depicted in FIG. 3 by way of example. The wave guides 20 and 30 are preferably formed from silicon oxynitride. Such wave guides may, for example, have a diameter in the range between 3 and 10 micro meters. The oxide layer 80 is penetrated at each cross point by a recess 140 intercepting and terminating beneath the underlying wave guides 20 and 30. A buffer layer is disposed at the base of each recess 140. In particularly preferred embodiments of the present invention, each recess 80 contains a liquid 150 or compliant gel having a refractive index matched to that of the wave guides 20 and 30. However, in some embodiments of the present invention, each recess 80 may be filled with other liquids or gases, including air, depending on application. By way of example, each recess may have a depth, in the range of between 10 and 20 micro meters, and a width in the range 5 to 20 micro meters. A reflective optical element 70 is suspended for movement both into and out of each recess 80 on a silicon cantilever 130. The reflective element comprises a silicon blade 120 having a coating 110 of gold or similarly reflective material. The optical element 70 may, for example, typically be between 10 and 20 micro meters long. The buffer layer 100 is formed from the same material as the coating 110. In operation, the cantilever 130 permits movement of the optical element 70 in a direction perpendicular to the plane of the wave guides between a second position in which the optical element 70 suspended within the recess in the paths of the wave guides 20 and 30 and, referring to FIG. 4, a first position in which the optical element is supported at a position remote from paths of the wave guides 20 and 30. In particularly preferred embodiments of the present invention, positioning of the cantilever 130 is bistable between the first and second positions of the optical element 70. By forming the buffer layer 100 and the coating from the same material, a breakable bond is formed between the optical element 70 and the base of the recess 140 when the optical element is in the second position. The bond assists both in stabilizing the reflective surface of the optical element 70 in the second position and in providing a tensioned snap action between the second and first positions.

Figure 5:
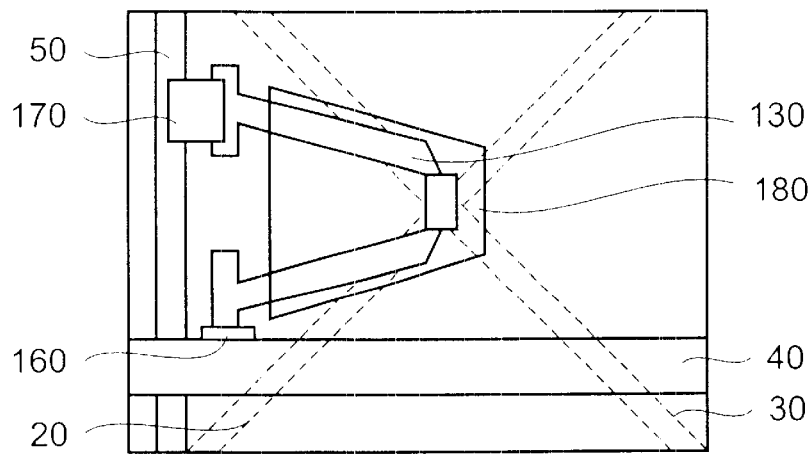
FIG. 5 is a plan view of a switching intersection of an optical switching device embodying the present invention.
Figure 6:
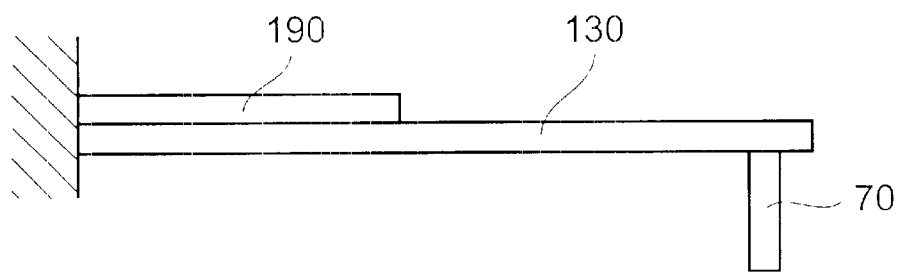
FIG. 6 is a side view of a cantilever for an optical switching device embodying the present invention.

Turning now to FIG. 5, each cantilever 130 has a U shaped structure with one end coupled the corresponding row conductor 40 via a diode 160 and the other end connected to the corresponding column conductor 50 via a bridging pad 170. The cantilever may reside in a depression 180 formed in the surface of oxide layer 80. Each row conductor 40 may be formed from nickel or similarly conductive material. Each column conductor 50 may be formed from gold or similarly conductive material. The pad 170 may be formed from nickel or similarly conductive material. The diodes 160 improve separation in addressing between the different cantilever 130. The cantilever 130 is doped to offer up a heating resistance to passage of current between the corresponding row and column conductors 40 and 50. Referring now to FIG. 6, disposed on the cantilever 130 is a layer 190 of material having a different coefficient of thermal expansion to material from which the cantilever 130 is formed. When current flows through the cantilever 130, both the cantilever 130 and the layer 190 are heated. The dissimilar expansion of the cantilever 130 and the layer 190 causes the cantilever to bend, thereby dipping the optical element 70 into the recess 140 as shown in FIG. 3.

Further details of the aforementioned cantilever structure is provided in "*The Millipede—More than one thousand tips for future AFM data storage*", Vettiger et. al, *IBM Journal of Research and Development, Vol.*44 No.3 May 2000, the content of which is incorporated herein by reference.

Figure 7:
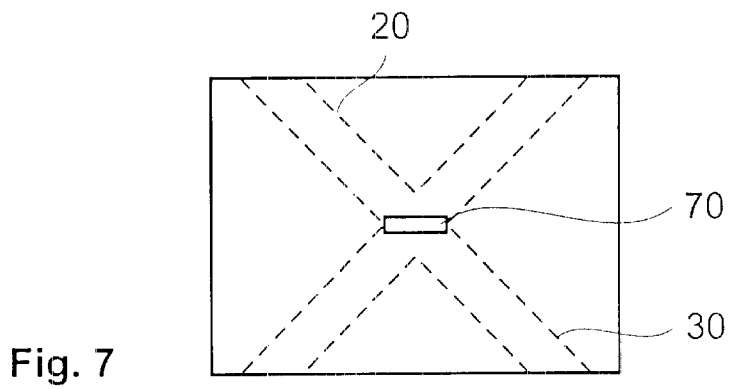
FIG. 7 is a magnified and simplified plan view of a switching intersection of an optical switching device embodying the present invention.

Referring now to FIG. 7, the optical element is angled at 45 degrees relative to the orthogonal wave guides 20 and 30 approaching the recess 140 such that, when the optical element 70 is in the second position, light traveling into the recess 140 on one wave guide 20 is diverted through 90 degrees to exit the recess 140 via the other wave guide 30. It will be appreciated that, in other embodiments of the present invention, the wave guides 20 and 30 may meet each other at angle other than 90 degrees. In such embodiments, the optical element 70 may be correspondingly angled relative to the approaching wave guides 20 and 30 such the light emerging from one wave guide 20 is directed into the other wave guide 30 when the optical element 70 is in the second position.

Figure 8:
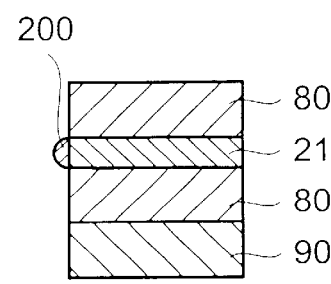
FIG. 8 is a cross-sectional view of an edge of an optical switching device embodying the present invention.

Turning to FIG. 8, in some embodiments of the present invention optical fibers may be feed directly into the device thereby aligning light for transfer through the device. However, in other embodiments of the present invention, light may approach the wave guides 20 and 30 of the device at an angle. Such embodiments may comprise a ball lens 200 disposed at the ends of each wave guide 20 and 30 for collimating incident light in preparation for transfer through the device.

Figure 9:
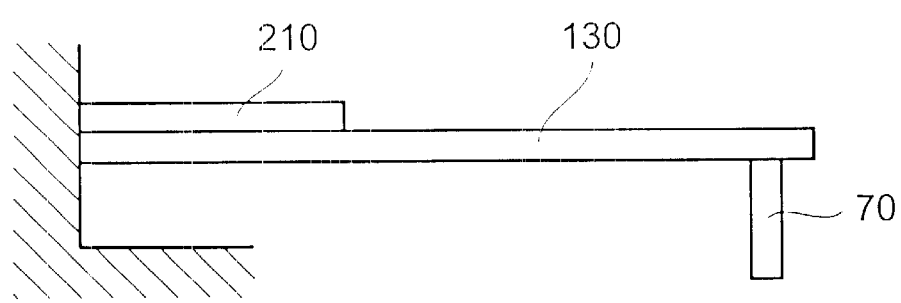
FIG. 9 is a side view of another cantilever for an optical switching device embodying the present invention.
Figure 10:
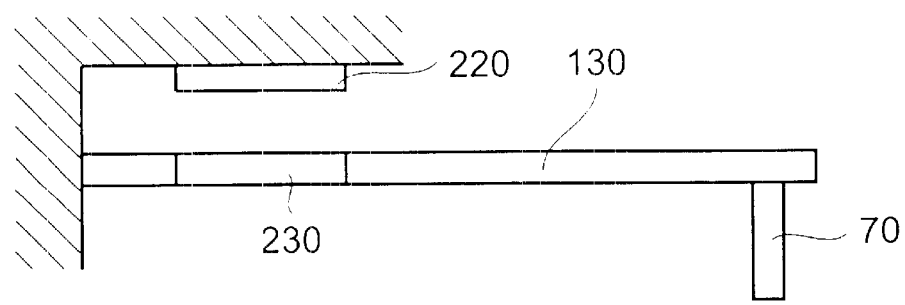
FIG. 10 is a side view of yet another cantilever for an optical switching device embodying the present invention.
Figure 11:
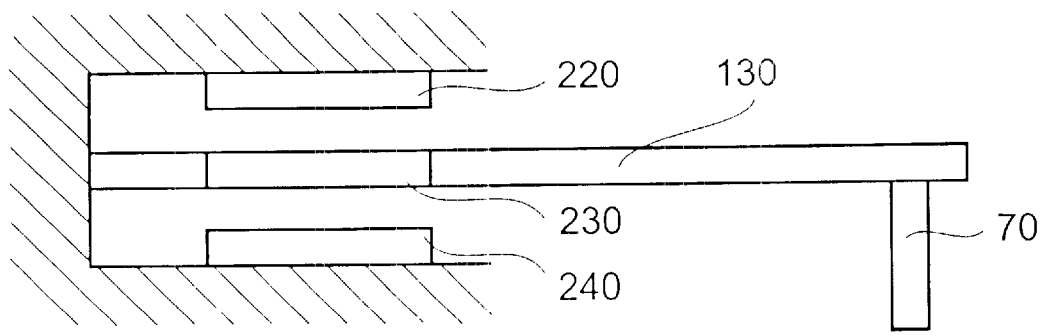
FIG. 11 is a side view of a further cantilever for an optical switching device embodying the present invention.

In the preferred embodiment of the present invention herein before described with reference to FIG. 6, each cantilever 130 is moved between the first position and the second position via thermal expansion. However, in other embodiments of the present invention, different techniques may be employed for moving the cantilevers 130. For example, referring to FIG. 9, in some embodiments of the present invention, the cantilevers 130 may each carry a layer 210 of a piezoelectric material such as lithium niobate for producing expansion, and thus bending of the cantilever 130, in response to a voltage applied through the associated row and column conductors 40 and 50. In another example, referring to FIG. 10, each cantilever 130 may carry a capacitive plate 230 facing a counterpart capacitive plate 220 attached to structure supporting the cantilever 130 such that an electric field established between the plates 220 and 230 via the associated row and column conductors 40 and 50 forces the cantilever 130 to bend. In yet another example, referring to FIG. 11, a capacitive plate 240 is disposed on the support structure on the side of the cantilever 130 remote from plate 220. In this arrangement, an electric field is established between plates 220 and 240 via the associated row and column conductors 40 and 50. Plate 230, and therefore the cantilever 130 are moved under the influence of the electric field established between plates 220 and 240. In other embodiments of the present invention, electromagnetic forces may be employed to move the cantilevers 130. In further alternative embodiments the present invention, each cantilever 130 may be moved by a diaphragm moveable between, for example convex and concave forms.

Figure 12:
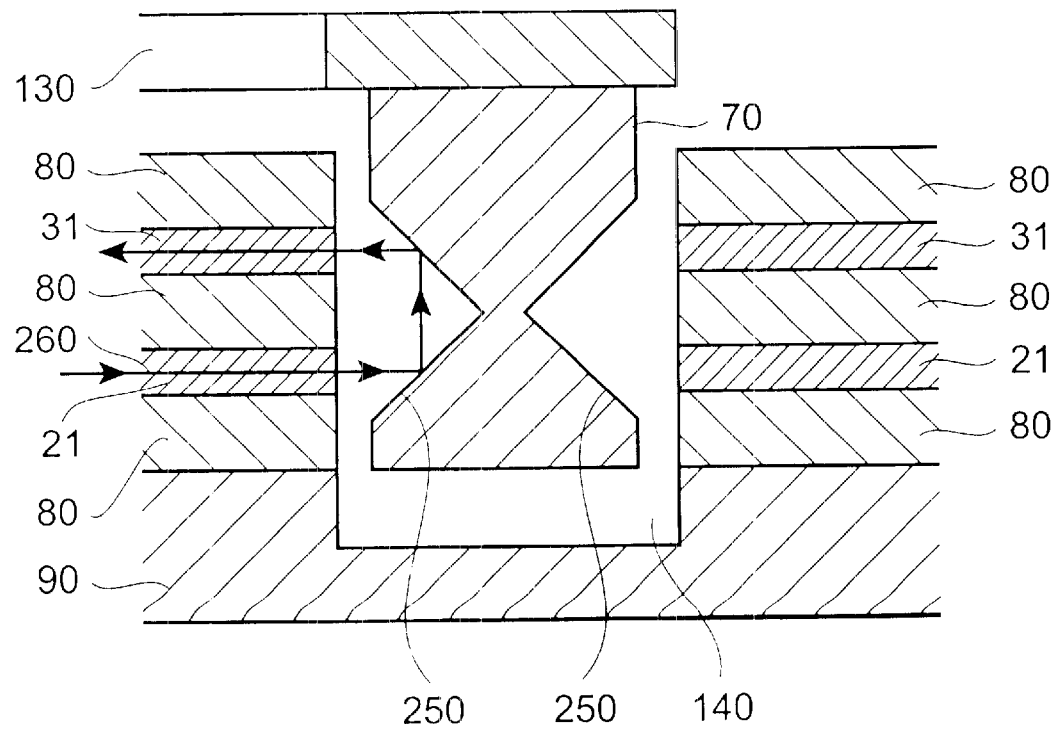
FIG. 12 is a cross-sectional view of a switching intersection of another optical switching device embodying the present invention.

Referring now to FIG. 12, in another embodiment of the present invention, the wave guides of the first and second groups 20 and 30 extend through the device in the same direction. However, the first group of wave guides 20 is disposed in a plane parallel to and spaced from the second group of wave guides 30. The spacing is demonstrated in FIG. 12 by representative wave guides 21 and 31. The optical element 70 comprises angled reflective surfaces 140. The apex of the angled surfaces extends in a direction parallel to the planes of the wave guides 20 and 30. When located in the second position, the angled reflective surfaces divert light 260 entering the recess via the wave guide 21 of the first group 20 onto the corresponding wave guide 31 of the second group. In a modification to this embodiment of the present invention, the first and second groups of wave guides are interlaced in the same plane and the apex of the angled reflective surface 250 extends in a direction normal to the plane of the wave guides 20 and 30. It will be appreciated that this arrangement is particularly advantageous for providing loop back functions in optical telecommunication systems. In particular, it will be appreciated that this arrangement may be employed in an optical ring communication system for providing ring reconfiguration "wrap" functions in the event of, for example, failure of upstream or downstream nodes or links in the ring.

Figure 13:
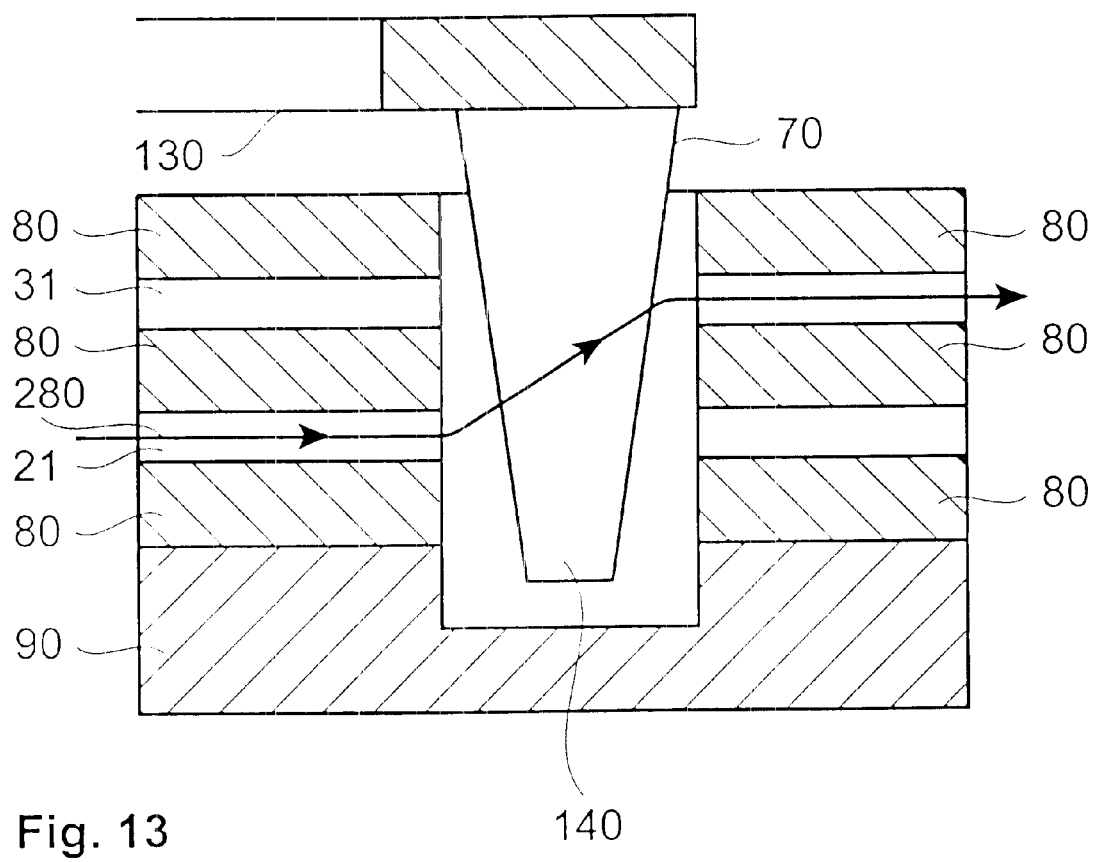
FIG. 13 is a cross-sectional view of a switching intersection of yet another optical switching device embodying the present invention.

Referring now to FIG. 13, in another modification of the present invention, the wave guides of the first and second groups 20 and 30 again extend through the device in the same direction, and the first group of wave guides 20 is disposed in a plane parallel to and spaced from the second group of wave guides 30. The spacing is demonstrated in FIG. 13 again by representative wave guides 21 and 31. However, the optical element 70 has a refractive index selected such that, when the optical element 70 is located in the second position, light 280 passing into the recess 140 on the wave guide 21 of the first group 20 is deflected as it passes through the optical element 70 to exit the recess 140 on the second wave guide 31.

Figure 14:
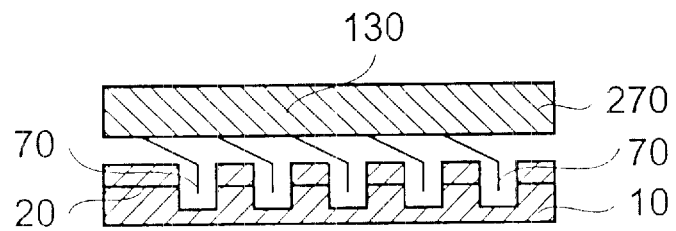
FIG. 14 is a cross sectional view of another optical switching device embodying the present invention.

In the embodiments of the present invention herein before described, the cantilevers 130 were integrated with the wave guides 20 and 30 on a single substrate 10. However, referring to FIG. 14, in another embodiment of the present invention, the cantilevers 130 are disposed on a separate substrate 270 from the substrate 10 on which the wave guides 20 and 30 are disposed. The substrates 270 and 10 are aligned, during assembly, such that the optical elements 70 are suspended to engage corresponding recesses 70 formed on the substrate 10 when actuated. Complementary formations (not shown) on the substrates 10 and 270 provide support and alignment of the substrates relative to each other.

The example of the present invention herein before described with reference to FIG. 1 included a 4×4 matrix of cross points 60. It will be appreciated however that, in other embodiments of the present invention, different sized cross point matrices, including a unitary matrix consisting of a single cross point 60, may be provided. It will also be appreciated that the cross points 60 in such matrices may be configured to provide different functions, such as ring memories comprising a plurality of optical storage loops and dispersion concentrators also comprising plural optical loops. In the preferred embodiments of the present invention herein before described, there were provided two groups of wave guides 20 and 30 between which optical switching was effected. However, it will be appreciated that other embodiments of the present invention may comprises more than two groups of wave guides between which optical signal paths can be switched at each cross point 60. Also, in the preferred embodiments of the present invention herein before described, the positioning of the optical elements 70 was bistable, toggling between second and first positions depending the state of corresponding row and column address conductors 40 and 50. However, it will be appreciated that, in other embodiments of the present invention, the positions of the optical elements 70 may be selected from a range a different positions. In the embodiment of the present invention herein before described, the optical element 70 was employed to selectively divert light between first and second paths 20 and 30. However, in other embodiments of the present invention, the optical element 70 may be employed simply to selectively modify light traveling along a path 20. For example, in such embodiments of the invention, the optical element 70 may comprises a polarizer, attenuator, phase changer or similar light modifier for conditioning optical signals.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. An optical device comprising: a first substrate and a second substrate facing the first substrate having a substantially plane surface; an optical path disposed on the first substrate and extends in a plane parallel to the surface of the first substrate; in recess intercepting the optical path; an optical element for modifying light incident thereon, the optical element being moveable within the recess between a first position in which the optical element is located in the path and a second position in which optical element is remote from the path; characterized in that the device comprises a cantilever, formed on the second substrate, for suspending the optical element for movement within the recess between the second and first positions in a direction normal to the surface of the substrate, wherein the optical path is disposed on the first substrate and the cantilever is disposed on the second substrate, and the optical element on the cantilever is aligned for entry in a corresponding recess in the first substrate.

2. A device as claimed in claim 1, wherein the optical element comprises an attenuator.

3. A device as claimed in claim 1, wherein the optical element comprises a polarizer.

4. A device as claimed in claim 1, wherein the optical element comprises a phase changer.

5. A device as claimed in claim 1, comprising first and second optical paths each disposed on the substrate, each optical path extends in a plane parallel to the surface of the first substrate, and each optical path being intercepted by the recess; the optical element diverting light entering the recess on the first path onto the second path when the optical element is located in the first position.

6. A device as claimed in claim 5, wherein the optical element comprises a refractive index.

7. A device as claimed in claim 6, wherein the first and second optical paths are coplanar.

8. A device as claimed in claim 7, wherein the first optical path is parallel to the second optical path.

9. A device as claimed in claim 5, wherein the optical element comprises a reflective surface, said reflective surface comprises a pair a reflective faces meeting at an angle such that, when the optical element is located in the first position, light arriving at the surface from the first path is reflected via the faces into the second path, the direction of travel of the light along the second path being opposite to the direction of travel of light along the first path.

10. A device as claimed in claim 5, wherein the first and second optical paths intersect, the recess being located at the point of intersection.

11. A device as claimed in claim 10, wherein the optical element comprises a reflective surface, said reflective surface is angled relative to the first and second paths such that, when the optical element is located in the first position, light arriving at the surface from the first path is reflected into the second path.

12. A device as claimed in claim 11, wherein the first path is orthogonal to the second path and the reflective surface is angled substantially at 45 degrees relative to the first and second paths.

13. A device as claimed in claim 5, wherein the plane containing the first path is spaced from the plane containing the second path and the first path is parallel to the second path.

14. A device as claimed in claim 13, wherein the optical element comprises a reflective surface having a pair a reflective faces meeting at an angle such that, when the optical element is located in the first position, light arriving at the surface from the first path is reflected via the faces into the second path, the direction of travel of the light along the second path being opposite to the direction of travel of light along the first path.

15. A device as claimed in claim 13, wherein the optical element comprises means for deflecting incident light such that, when the optical element is located in the first position, light entering the recess via the first path exits the recess via the second path, the direction of travel of the light in the first path being substantially the same as the direction of travel of the light in the second path.

16. A device as claimed in claim 5, comprising a group of first paths, a group of second paths, a plurality of row conductors, a plurality of column conductors, and a matrix of recesses each intercepting a different combination of the first and second paths, each recess having an optical element and a supporting cantilever associated therewith, and each optical element and supporting cantilever being addressable for movement between the first and second positions via a different combination of row and column conductors.

17. A dispersion compensate or comprising a device as claimed in claim 16, and means for configuring the optical elements to arrange at least some of the optical paths into one or more optical loops.

18. An optical memory comprising a device as claimed in claim 16, and means for configuring the optical elements to arrange at least some of the optical paths into one or more optical data storage loops.

19. A device as claimed in claim 1, wherein the optical element comprises a reflective surface.

20. A device as claimed in claim 19 wherein the first and second optical paths are coplanar.

21. A device as claimed in claim 1, wherein the reflective surface comprises a pair a reflective faces meeting at an angle such that, when the optical element is located in the first position, light arriving at the surface from the first path is reflected via the faces into the second path, the direction of travel of the light along the second path being opposite to the direction of travel of light along the first path.

22. device as claimed in claim 1, wherein the plane containing the first path is spaced from the plane containing the second path and the first path is parallel to the second path in a direction normal surface of the substrate.

23. A device as claimed in claim 22, wherein the optical element comprises a reflective surface having a pair reflective faces meeting at an angle such that, when the optical element is located in the first position, light arriving at the surface from the first path is reflected via the faces into the second path, the direction of travel of the light along the second path being opposite to the direction of travel of light along the first path.

24. A device as claimed in claim 23, wherein the optical element comprises means for deflecting incident light such that, when the optical element is located in the first position, light entering the recess via the first path exits the recess via the second path, the direction of travel of the light in the first path being substantially the same as the direction of travel of the light in the second path.

25. A method for manufacturing as optical device comprising the steps of: providing a first substrate and a second substrate facing the substrate having a substantially plane surface; providing an optical path on the first substrate and extending said optical path in a plane parallel to the surface of the first substrate; forming, in the first substrate, a recess intercepting the optical path; suspending, via a cantilever disposed on the second substrate, an optical element adapted to modify light incident thereon for movement within the recess, in a direction normal to the surface of the first substrate, between a first position in which the optical element is located in the path and a second position in which optical element is remote from the path.

26. A method for manufacturing an optical device comprising the steps of: providing a first substrate having a substantially plane surface; providing an optical path on the first substrate and extending said optical path in a plane parallel to the surface of the substrate; forming, in the first substrate, a recess intercepting the optical path; providing a second substrate facing the first substrate having a substantially plane surface; providing a cantilever on the second substrate, mounting an optical element on the cantilever, supporting the surface of the second substrate parallel to the surface of the first substrate; and aligning the optical element carried by the second substrate for entry in the recess formed in the first substrate.

27. An optical device comprising: a substrate having a substantially plane surface; first and second optical paths each disposed on the substrate, each path extending in a plane parallel to the surface of the substrate ; a recess intercepting the optical paths; an optical element for modifying light incident thereon, the optical element being moveable within the recess between a first position in which the optical element is located in the paths and a second position in which the optical element is remote from the paths; a cantilever for suspending the optical element for movement within the recess between the second and first positions in a direction normal to the surface of the substrate, the optical element diverting light entering the recess on the first path onto the second path when the optical element is located in the first position wherein in that the first optical path is parallel to the second optical path.

28. A method for manufacturing an optical device comprising: providing a substrate having a substantially plane surface; providing first and second optical paths each disposed on the substrate, each extending in a plane parallel to the surface of the substrate, the first optical path being parallel to the second optical path; forming, in the substrate, a recess intercepting the optical path; suspending, via a cantilever, an optical element adapted to modify light incident thereon for movement within the recess, in a direction normal to the surface of the substrate, between a first position in which the optical element is located in the paths and a second position in which optical element is remote from the paths, the optical element diverting light entering the recess on the first path onto the second path when the optical element is located in the first position.

29. A method for manufacturing an optical device comprising: providing a first substrate having a substantially plane surface; providing first and second optical paths each disposed on the substrate each extending in a plane parallel to the surface of the substrate, the first optical path being parallel to the second optical path; forming, in the first substrate, a recess intercepting the optical path; providing a second substrate having a substantially plane surface; providing a cantilever on the second substrate, mounting an optical element on the cantilever, supporting the surface of the second substrate parallel to the surface of the first substrate; and aligning the optical element carried by the second substrate for entry in the recess formed in the first substrate.

* * * * *